(12) United States Patent
Nakajima et al.

(10) Patent No.: US 7,174,161 B2
(45) Date of Patent: Feb. 6, 2007

(54) RADIO COMMUNICATION APPARATUS AND RADIO COMMUNICATION METHOD

(75) Inventors: Tetsu Nakajima, Kanagawa-Ken (JP); Tomoko Adachi, Chiba-Ken (JP); Kiyoshi Toshimitsu, Kanagawa-Ken (JP); Takafumi Sakamoto, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 112 days.

(21) Appl. No.: 10/899,094

(22) Filed: Jul. 27, 2004

(65) Prior Publication Data

US 2005/0037802 A1    Feb. 17, 2005

(30) Foreign Application Priority Data

Aug. 12, 2003   (JP)   ............... 2003-292395

(51) Int. Cl.
*H04Q 7/20*    (2006.01)

(52) U.S. Cl. .................. 455/411; 455/550.1; 455/425; 455/560; 455/574; 380/247; 713/168

(58) Field of Classification Search ........ 455/410–411, 455/422.1, 425, 41.1–41.2, 502, 515, 517, 455/550.1, 553, 73, 82, 561; 713/168–170; 380/247–250
See application file for complete search history.

(56) References Cited

U.S. PATENT DOCUMENTS

| | | | |
|---|---|---|---|
| 5,329,573 A * | 7/1994 | Chang et al. | ................ 455/411 |
| 5,987,033 A | 11/1999 | Boer et al. | |
| 2001/0048744 A1* | 12/2001 | Kimura | ...................... 455/411 |
| 2002/0181428 A1* | 12/2002 | Kruys | ........................ 370/338 |
| 2003/0016760 A1* | 1/2003 | Kruys | ........................ 375/295 |
| 2003/0050078 A1* | 3/2003 | Motegi et al. | .............. 455/574 |
| 2003/0064752 A1* | 4/2003 | Adachi et al. | .............. 455/550 |
| 2004/0192211 A1* | 9/2004 | Gallagher et al. | .......... 455/423 |
| 2004/0203356 A1* | 10/2004 | Takatori et al. | ............ 455/41.1 |

FOREIGN PATENT DOCUMENTS

| | | |
|---|---|---|
| EP | 0 615 364 A1 | 9/1994 |
| EP | 0 655 872 A2 | 5/1995 |
| JP | 7-254872 | 10/1995 |
| JP | 7-327256 | 12/1995 |
| WO | WO 02/47321 A2 | 6/2002 |

OTHER PUBLICATIONS

"Power Management"; ANSI/IEEE STD 802.11, 1999 Edition; Chap. II; Sec. 2, pp. 128-163.

* cited by examiner

*Primary Examiner*—Jean Gelin
*Assistant Examiner*—Kamran Afshar
(74) *Attorney, Agent, or Firm*—Oblon, Spivak, McClelland, Maier & Neustadt, P.C (57) ABSTRACT

A radio communication apparatus which can communicate with a base station in radio communication, comprising: an antenna; a reception processing unit which receives a signal transmitted from the base station via the antenna; an indication signal processing unit which processes an indication signal including information on the base station, the indication signal being transmitted from the base station periodically; and an authentication processing unit which performs authentication processing with the base station to establish communication connection between the base station and the radio communication apparatus, wherein, when the reception processing unit and the indication signal processing unit are in ON state, unitthe authentication processing unit is in OFF state.unitunit.

15 Claims, 8 Drawing Sheets

STA

RADIO COMMUNICATION APPARATUS AND RADIO COMMUNICATION METHOD

CROSS-REFERENCE TO RELATED APPLICATION

This application is based upon and claims the benefit of priority from the prior Japanese Patent Application No. 2003-292395, filed on Aug. 12, 2003, the entire contents of which are incorporated herein by reference.

BACKGRROUND OF THE INVENTION

1. Field of the Invention

The present invention relates to a radio communication apparatus and a radio communication method.

2. Related Background Art

A radio base station (also called AP (Access Point), which is hereinafter simply describes as a base station) periodically transmits a beacon signal (beacon) to a radio communication apparatus (also called STA (Station)) existing in a cell which a radio wave reaches. The beacon includes information, such as time information on a base station, information to establish communication between a base station and a terminal, a time when the next beacon is transmitted, information about data accumulation status to be transmitted to a radio communication apparatus in the base station.

The radio communication apparatus receives beacons periodically transmitted from the base station. The beacons allow the radio communication apparatus to grasp information in the cell and continue to be synchronized with the base station. Further, since the beacon includes information about data accumulation status to be transmitted to the radio communication apparatus, each radio communication apparatus can know whether or not non-transmitted data to be transmitted from the base station to the radio communication apparatus is accumulated in the base station.

A conventional radio communication apparatus has two modes of Doze mode which stops the whole of a transmission/reception system in a radio communication apparatus and Awake mode which activates the whole of the transmission/reception system. The Doze mode is a mode where it has power consumption lower than that in the Awake mode. When non-transmitted data has been accumulated in the base station, the radio communication apparatus is switched to the Awake mode to receive the non-transmitted data from the base station. When there is no non-transmitted data in the base station, the radio communication apparatus is switched to the Doze mode to reduce power consumption in the radio communication apparatus. For example, refer to JP07-327256A (Kokai) and JP07-254872A (Kokai).

However, since the conventional radio communication apparatus receives beacon periodically transmitted from the base station even if there is not non-transmitted data in the base station, it must be put in the Awake mode periodically. This causes such a problem that wasteful power is required for the radio communication apparatus.

In order to further reduce consumption of the wasteful power, the conventional radio communication apparatus is constituted so as to intermittently receive beacons periodically transmitted from the base station instead of each reception of these signals.

However, the radio communication apparatus which receives beacons intermittently does not solve the above problem fundamentally. Further, since the radio communication apparatus receives beacons intermittently, such problems to reduce throughput, delay of data transmission and, increase in data accumulation amount in a base station arise.

SUMMARY OF THE INVENTION

An advantage of an aspect of the present invention is to provide a radio communication apparatus which has achieved decrease in power consumption as compared with the conventional device while solving such problems to reduce throughput of data transmitted from the base station to the radio communication apparatus, delay of data transmission, or increase in data accumulation amount in a base station.

A radio communication apparatus according to an embodiment of the present invention, which can communicate with a base station in radio communication, comprising:

an antenna;

a reception processing unit which receives a signal transmitted from the base station via the antenna;

an indication signal processing unit which processes an indication signal including information on the base station, said indication signal being transmitted from the base station periodically; and an authentication processing unit which performs authentication processing with the base station to establish communication connection between the base station and the radio communication apparatus, wherein, when the reception processing unit and the indication signal processing unit are in ON state, authentication processing unit is in OFF state.

A radio communication method according to an embodiment of the present invention, which uses a radio communication apparatus including a reception processing unit which receives a signal transmitted from a base station in radio communication, and a processor processing an indication signal which includes information about the base station and which is transmitted from the base station periodically, said processor conducting an authentication processing with the base station to establish communication connection between the base station and the radio communication apparatus, comprising maintaining the reception processing unit and the processor in OFF state while the reception processing unit is not receiving the indication signal, and processing the indication signal at the processor without processing the authentication when the reception processing unit receives the indication signal.

A radio communication apparatus according to an embodiment of the present invention comprises a processor processing an indication signal which includes information indicating presence or absence of non-transmitted data to be transmitted from a base station to the radio communication apparatus, said processor processing an authentication processing with the base station to receive the non-transmitted data from the base station, said indication signal being transmitted from the base station periodically; wherein the radio communication apparatus can be in one of states including a first mode in which the processor processes the indication signal to receive the indication signal, a second mode in which the processor conducts the authentication processing to receive the non-transmitted data and a third mode in which the processor does not process the indication signal or conduct the authentication processing.

A radio communication apparatus according to an embodiment of the present invention, which can communicate with a base station in radio communication, comprising:

an antenna;

a reception processing unit which receives a signal transmitted from the base station via the antenna;

a transmission processing unit transmitting data to the base station via the antenna;

an indication signal processing unit which processes an indication signal including information on the base station, said indication signal being transmitted from the base station periodically;

an authentication processing unit which performs authentication processing with the base station to establish communication connection between the base station and the radio communication apparatus; and an association processing unit which performs association processing with the base station;

wherein, when the reception processing unit receives the indication signal, the transmission processing unit, the authentication processing unit and the association processing unit are maintained in OFF state, and the reception processing unit and the indication signal processing unit is in ON state to process the indication signal.

DETAILED DESCRIPTION OF THE INVENTION

Embodiments of the present invention will be explained below with reference to the drawings. The present invention is not limited to the embodiments.

The term "indication signal" used in this specification means "beacon signal".

In this specification, the term "ON state" means a state that a function is working and the term "OFF state" means a state that the function is stopped. In other words, "OFF state" may be referred to stand-by state.

A radio communication apparatus according to an embodiment of the present invention is switched to a Lazy mode that only elements required for processing the beacon are actuated without actuating a whole transmission/reception system when the radio communication apparatus receives a beacon. Thereby, the radio communication apparatus can reduce consumption power when receives the beacon.

The following embodiments are applied to a Wireless LAN system according to IEEE802.11. However, the present invention can be applied to not only IEEE802.11 but also other radio communication systems. The following embodiments are based on a power save mode according to IEEE802.11.

(First Embodiment)

Figure 1:
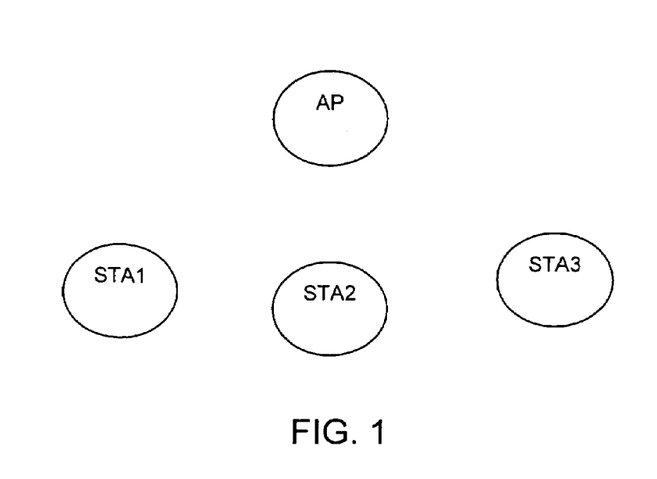
FIG. 1 is a configuration diagram of a Wireless LAN system according to a first embodiment of the present invention.

FIG. 1 is a configuration diagram of a Wireless LAN system according to a first embodiment of the present invention. Radio communication apparatuses STA1, STA2 and STA3 exist in a cell of a base station AP. The radio communication apparatuses STA1, STA2 and STA3 can communicate with one another via the base station AP. The number of the radio communication apparatuses existing in the cell is not limited to three, and the radio communication apparatuses may communicate with a radio communication apparatus in another STA.

Figure 2:
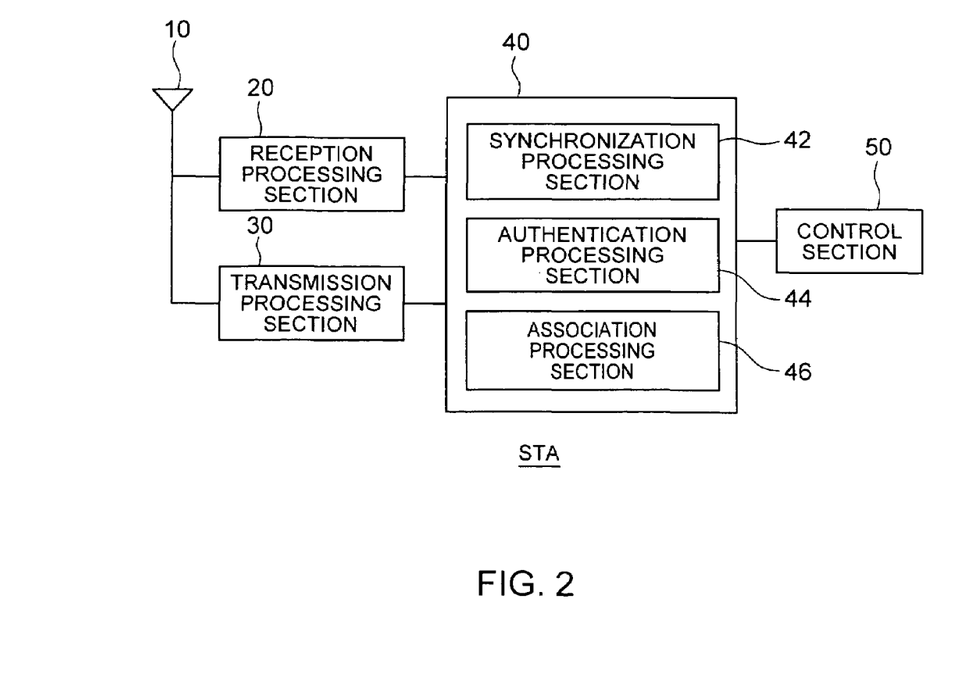
FIG. 2 is a block diagram of a radio communication apparatus STA according to the first embodiment of the present invention.

FIG. 2 is a block diagram of the radio communication apparatus STA according to the first embodiment of the present invention. The radio communication apparatus STA may be any one of the radio communication apparatuses STA1 to STA3 shown in FIG. 1.

As shown in FIG. 2, the radio communication apparatus STA comprises an antenna 10, a reception processing section 20, a transmission processing section 30, a status determining section 40 and a control section 50. The status determining section 40 includes a synchronization processing section 42, an authentication processing section 44 and an association processing section 46.

The reception processing section 20 receives a wave transmitted from the base station AP via the antenna 10 to perform digital conversion on the wave. The transmission processing section 30 converts a digital signal to a transmission wave signal to transmit the same to the base station AP via the antenna 10.

The synchronization processing section 42 acquires information from the beacon, which information is such as time information of a base station, information for maintaining communication connection between the base station AP and a terminal STA, a time when the next beacon is transmitted, accumulation status of non-transmitted data to be transmitted to the radio communication apparatuses STA in the base station AP.

The synchronization processing section 42 sets the time of the radio communication apparatus STA to the time of the base station AP (though not illustrated, the radio communication apparatus STA is provided with a clock like the conventional device). Thereby, the clocks to be referred when data transmission/reception is performed show the same time in the base station AP and the radio communication apparatus STA, respectively.

The synchronization processing section 42 stores information necessary to perform communication between the radio communication apparatus STA and the base station AP into a memory or the like in the radio communication apparatus STA. When the information has been already stored into the memory or the like in the radio communication apparatus STA, the synchronization processing section 42 updates the stored information. The information necessary to perform communication between the radio communication apparatus STA and the base station AP includes a transmission interval of a beacon (beacon intervals), a transmission interval of a beacon (also called DTIM interval (DTIM Interval)) including DTIM (delivery traffic indication message), information about a capacity of the base station AP, ID (BSSID (basic service set identifier), SSID (service set identifier)) of a cell to which the radio communication apparatus STA belongs, a transmission rate of the base station AP, information about a transmission channel, or the like.

Further, when the radio communication apparatus STA is operating on the basis of the power save mode according to IEEE802.11, the synchronization processing section 42 makes determination about presence/absence of non-transmitted data accumulated in the base station AP to be transmitted from the base station AP to the radio communication apparatus STA. The base station AP temporarily stores data addressed to the radio communication apparatus STA on the basis of the power save mode according to IEEE802.11. In the specification, data which has been stored in the base station AP and has not been transmitted to the radio communication apparatus STA is called "non-transmitted data" for the sake of convenience in explanation.

The authentication processing section 44 performs authentication processing with the base station AP. Thereby, the radio communication apparatus STA can decode transmission data encrypted by the base station AP, so that data communication with the base station AP can be made possible.

The association processing section 46 recognizes a cell to which the radio communication apparatus STA belongs and the other radio communication apparatus(s) belonging to the cell. Further, the association processing section 46 causes a base station in another cell to recognize the cell to which the radio communication apparatus 46 itself belongs in order to conduct smooth communication with the another cell in a network comprising a plurality of cells. Thereby, the radio communication apparatus STA can perform data communication with each communication device or equipment in the world via a communication device or equipment in the network to which the radio communication apparatus STA itself belongs or via an internet to which the network belongs. The detail description of the association processing is described in "ANSI/IEEE Std 802.11, 1999 Edition 11.3 Association and reassociation"

The control section 50 operates according to a clock externally input without generating a clock internally to control the reception processing section 20, the transmission processing section 30 and the status determining section 40. Though not illustrated, control means which controls the whole of the radio communication apparatus STA exists like in a manner similar to the conventional device.

Figure 3:
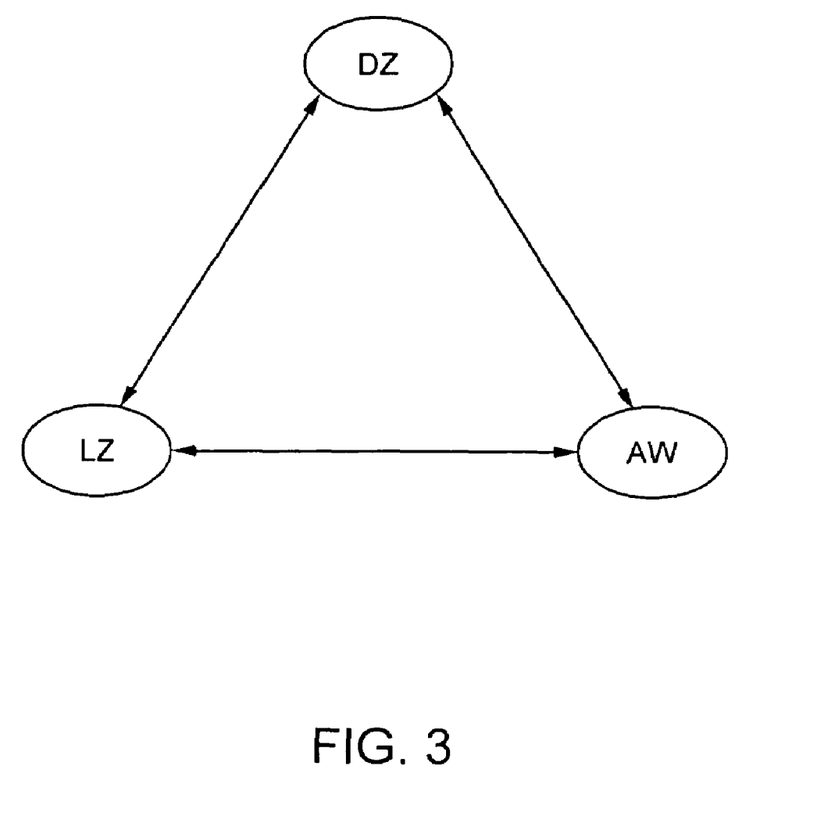
FIG. 3 is a conceptual diagram showing the operation mode of the radio communication apparatus STA.

FIG. 3 is a conceptual diagram showing the operation mode of the radio communication apparatus STA. The radio communication apparatus STA according to the embodiment can adopt Lazy mode as well as Doze mode DZ and Awake mode AW. These modes can be controlled by the control means controlling the whole of the radio communication apparatus STA.

The Doze mode DZ is a mode where all of the reception processing section 20, the transmission processing section 30, and the synchronization processing section 42, the authentication processing section 44 and the association processing section 46 included in the status determining section 40 are in OFF state.

The Awake mode AW is a mode where all of the reception processing section 20, and the synchronization processing section 42, the authentication processing section 44 and the association processing section 46 included in the status determining section 40, and the control section 50 are in ON state. When transmission processing is required in the Awake mode AW, the transmission processing section 30 also becomes ON state. On the other hand, when transmission processing is not required in the Awake mode AW, the transmission processing section 30 remains in OFF state, while the reception processing section 20, all of the synchronization processing section 42, the authentication processing section 44 and the association processing section 46 included in the status determining section 40, and the control section 50 are turned to ON state.

The Lazy mode LZ is a mode where the reception processing section 20, and the synchronization processing section 42 included in the status determining section 40 are in ON state, and the transmission processing section 30, the authentication processing section 44 and the association processing section 46 included in the status determining section 40, and the control section 50 are in OFF state.

Generally, when the radio communication apparatus STA receives data from the base station AP, all of the reception processing section 20, and the synchronization processing section 42, the authentication processing section 44 and the association processing section 46 must be in ON state. However, when the radio communication section STA receives a beacon from the base station AP, the reception processing section 20 and the synchronization processing section 42 must be in ON state, but the authentication processing section 44 and the association processing section 46 must not be in ON state. This is because processing of a beacon is performed in the synchronization processing section 42 in the status determining section 40, and authentication processing and mapping processing are not required.

In the Lazy mode LZ, since the reception processing section 20 and the synchronization processing section 42 are in ON state, the radio communication apparatus STA can process a beacon from the base station AP. On the other hand, in the Lazy mode LZ, since the transmission processing section 30, and the authentication processing section 44 and the association processing section 46 are in OFF state, the radio communication apparatus STA is reduced in power consumption as compared with the Awake mode AW.

Figure 4:
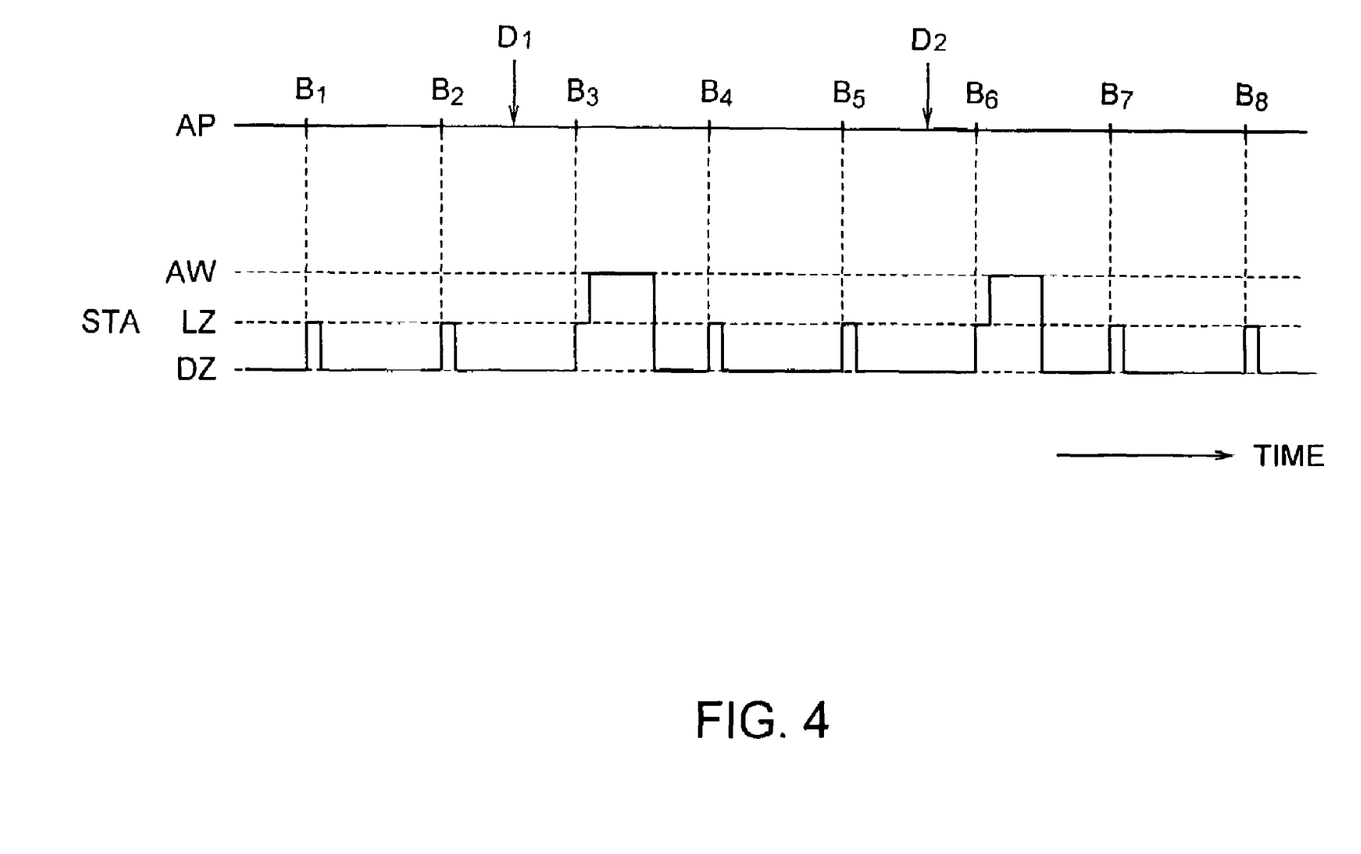
FIG. 4 is a diagram showing transmission period of beacons of a base station AP and a mode of the radio communication apparatus STA in a time elapsing manner.
Figure 5:
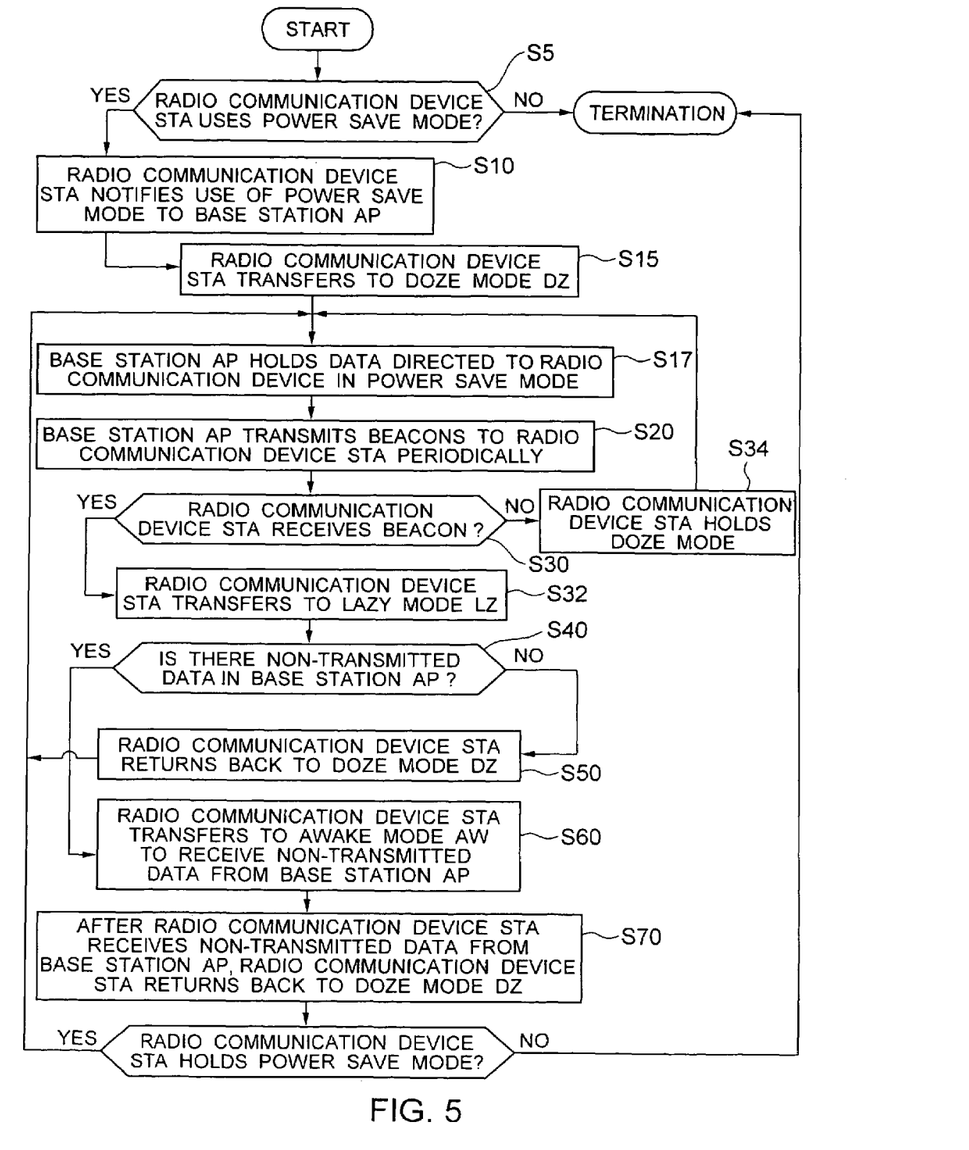
FIG. 5 is a flow diagram showing a flow of the operation of the radio communication apparatus STA.

FIG. 4 is a diagram showing transmission period of beacons of a base station AP and a mode of the radio communication apparatus STA in a time elapsing manner. FIG. 5 is a diagram showing a flow of the operation of the radio communication apparatus STA. Referring to FIG. 4 and FIG. 5, the operation of the base station AP and the radio communication apparatus STA will be explained. In FIG. 4, the operation modes AW, LZ and DZ of the radio communication apparatus STA are described in the order of modes with higher power consumption, i.e., in the order of the Awake mode AW, the Lazy mode LZ and the Doze mode DZ.

When the radio communication apparatus STA can use the power save mode according to IEEE802.11 (YES in Step S5), the radio communication apparatus STA notifies use of the power save mode to the base station AP (S10), and then it is changed to the Doze mode (S15). After Step S15, the base station AP holds data directed to the radio communication apparatus STA operating in the power save mode (S17). On the other hand, when the radio communication apparatus STA is not in the power save mode, the base station AP does not hold the data directed to the radio communication apparatus STA (NO in Step S5).

The base station AP periodically transmits beacons $B_1$ to $B_8$ to the radio communication apparatus STA (S20). When the radio communication apparatus STA receives the beacons $B_1$ to $B_8$ periodically (YES in Step S30), the radio communication apparatus STA is temporarily changed to the Lazy mode LZ (S32). When the radio communication apparatus STA does not receive the beacon (NO in Step S30), the radio communication apparatus STA operates in the Doze mode until it receives a beacon (S34).

When the radio communication apparatus STA receives a beacon, the synchronization processing section 42 shown in FIG. 2 makes determination about whether or not there is non-transmitted data in the base station AP on the basis of the information from the beacons $B_1$ to $B_8$ (S40). When there is not any non-transmitted data in the base station AP, the radio communication apparatus STA returns back to the Doze mode DZ (S50). On the other hand, when there is non-transmitted data in the base station AP, the radio communication apparatus STA is changed to the Awake mode AW. Therefore, the radio communication apparatus STA requests the base station AP to transmit the non-transmitted data, and then receives the non-transmitted data from the base station AP (S60). After the radio communication apparatus STA receives all the non-transmitted data from the base station AP, the radio communication apparatus STA returns back to the Doze mode DZ (S70).

In FIG. 4, for example, data (non-transmitted data) $D_1$, which is addressed to the radio communication apparatus STA and which is transmitted from another radio communication apparatus, is stored in the base station AP in an interval between the beacons $B_2$ and $B_3$. Non-transmitted data $D_2$ is stored in the base station AP in an interval between the beacons $B_5$ and $B_6$. Thereby, when the radio communication apparatus STA receives the beacons $B_3$ and $B_6$, the radio communication apparatus STA is changed to the Awake mode AW. After the radio communication apparatus STA receives the non-transmitted data from the base station AP, the radio communication apparatus STA returns back to the Doze mode DZ.

On the other hand, when the radio communication apparatus STA receives the beacons $B_1$, $B_2$, $B_4$, $B_5$, $B_7$ and $B_8$, there is not non-transmitted data stored in the base station AP. Thereby, the radio communication apparatus STA processes these beacons in the Lazy mode LZ, and then, after this processing is terminated, the radio communication apparatus STA returns back to the Doze mode DZ.

These Steps S10 to S70 are repeated as far as the radio communication apparatus STA is in the power save mode and it is receiving the beacons from the base station AP.

According to this embodiment, the radio communication apparatus STA receives the beacon in the Lazy mode LZ to process the beacon. The Lazy mode LZ requires lower power consumption as compared with the Awake mode AW, because the authentication processing section 44 and the association processing section 46 in the status determining section 40 are in OFF state. Since the beacons are transmitted periodically, when the radio communication apparatus STA is in the power save mode for a long time, the power consumption of the radio communication apparatus STA is remarkably reduced as compared with the conventional radio communication apparatus.

In the embodiment, the radio communication apparatus STA is changed to the Lazy mode LZ for each transmission of the beacon from the base station AP. Thereby, the synchronization processing section 42 processes all the beacons. Accordingly, the radio communication apparatus STA can reduce power consumption without lowering the throughput in data communication.

The radio communication apparatus STA may transfer to the Lazy mode LZ for each transmission of a plurality of beacons from the base station AP. That is, the radio communication apparatus STA may receives the beacons intermittently. Thereby, the power consumption in the radio communication apparatus STA can further be reduced.

Transmission data from the base station AP includes information indicating presence/absence of other non-transmitted data. Thereby, in case that a plurality of non-transmitted data pieces are stored in the base station AP in an interval between a beacon and the next beacon, when the radio communication apparatus STA receives one data of the plurality of non-transmitted data, the radio communication apparatus STA can recognize such a fact that the other non-transmitted data still remain in the base station AP. Thereby, in this case, the radio communication apparatus STA is held in the Awake mode AW until the final non-transmitted data is transmitted from the base station AP to the radio communication apparatus STA. After the radio communication apparatus STA receives the final non-transmitted data, it is changed to the Doze mode DZ.

(Second Embodiment)

Figure 6:
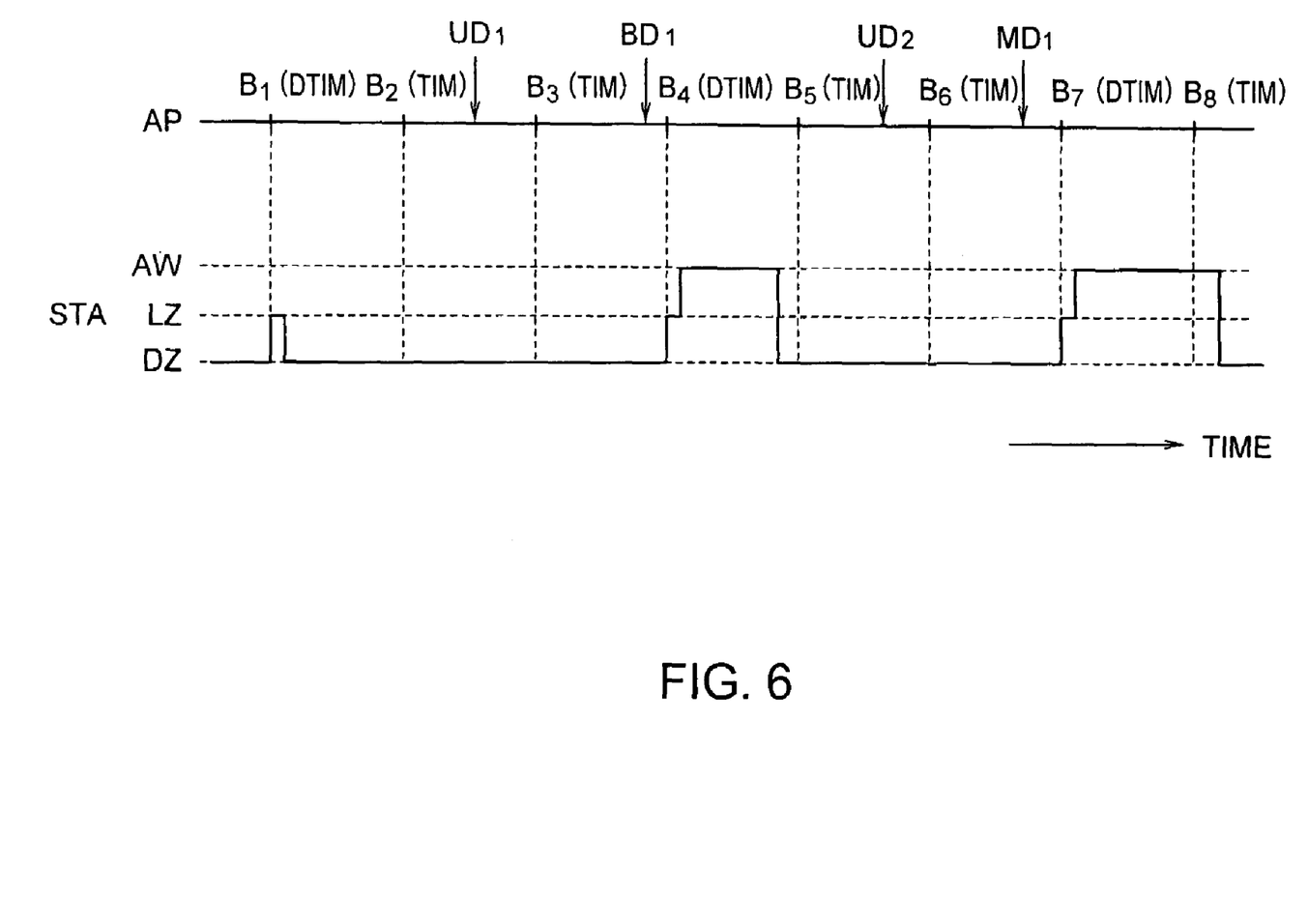
FIG. 6 is a diagram showing transmission period of beacons of base station AP and a mode of the radio communication apparatus STA in a time elapsing manner according to a second embodiment.
Figure 7:
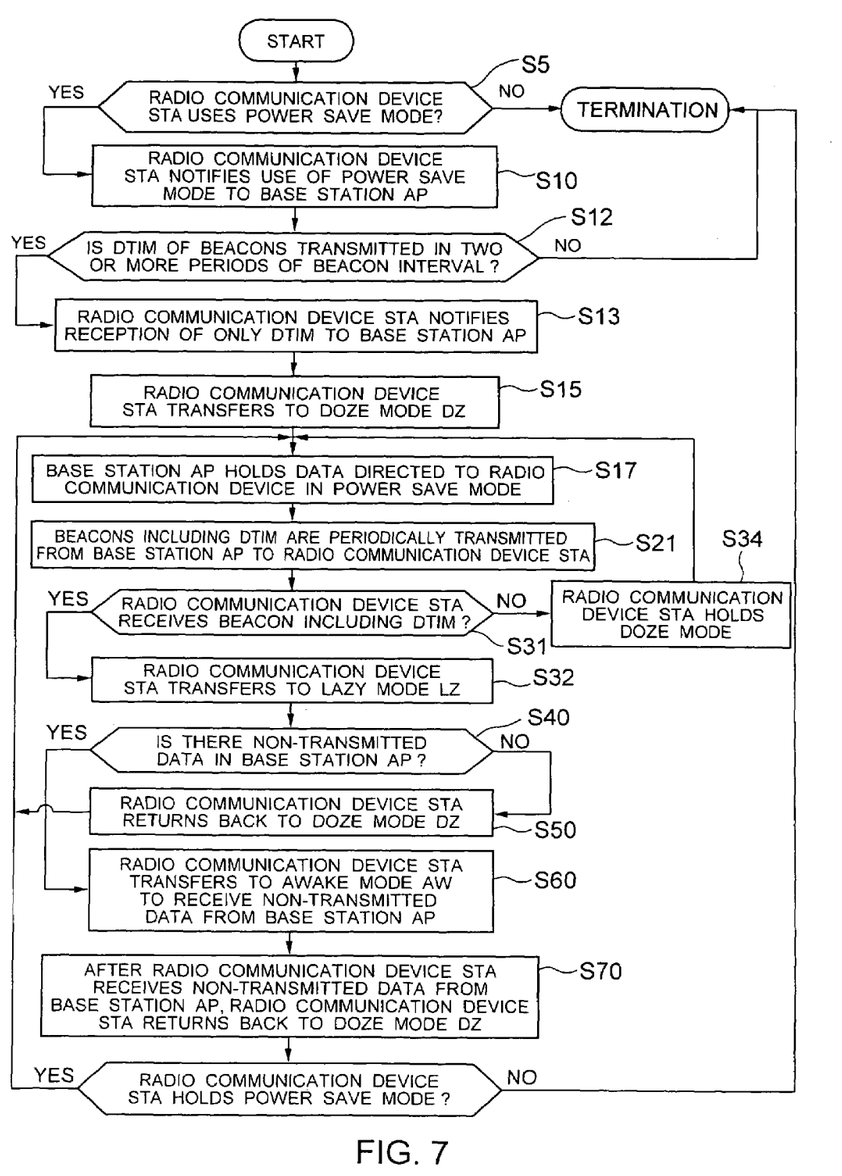
FIG. 7 is a flow diagram showing a flow of the operation of the radio communication apparatus STA according to the second embodiment.

FIG. 6 is a diagram showing transmission period of beacons of base station AP and a mode of the radio communication apparatus STA in a time elapsing manner according to a second embodiment. FIG. 7 is a flow diagram showing a flow of the operation of a radio communication apparatus STA according to the second embodiment. This embodiment can be implemented using the radio communication apparatus STA shown in FIG. 2. In this embodiment, the radio communication apparatus STA discriminates between a beacon including DTIM and a beacon including TIM from each other in order to receive the beacons intermittently.

In a wireless LAN system according to IEEE802.11, generally, there is a beacon including DTIM (Delivery Traffic Indication Message) and a beacon including TIM (Traffic Indication Message). The DTIM and the TIM are common in that presence/absence of non-transmitted data in the base station AP is notified to the radio communication apparatus STA in the power save mode, but there is a difference in content of the non-transmitted data between the DTIM and the TIM. That is, the DTIM notifies information about presence/absence of data pieces addressed to all radio communication apparatuses existing in and out of the cell to which the radio communication apparatus STA belongs (also called "broadcast data"), presence/absence of data pieces directed to a plurality of radio communication apparatuses (also called "multicast data"), and presence/absence of data directed to the radio communication apparatus STA, namely directed to its own station STA (also called "unicast data"). The TIM notifies information about presence/absence of the unicast data as non-transmitted data, but the TIM does not notify information about presence/absence of the broadcast data and presence/absence of the multicast data.

In this embodiment, the radio communication apparatus STA receives a beacon including DTIM but does not receive a beacon including only TIM in the power save mode. The base station AP transmits a beacon including DTIM for each transmission of three beacons. For example, it is assumed that the beacons $B_1$, $B_4$ and $B_7$ among the beacons $B_{1\ to\ B8}$ include DTIM and the other beacons include TIM. That is, in this embodiment, DTIM interval is three periods. DTIM interval may be two periods or it may be four or more periods. Here, one period is a cycle (also called "beacon interval") where a beacon is transmitted from the base station AP.

In the embodiment, first, Steps S5 and S10 shown in FIG. 5 are performed. Next, the radio communication apparatus STA makes determination whether or not beacons including DTIM in a cell, to which the radio communication apparatus STA will be belonged, is transmitted with two or more periods of the beacon interval (S12). When DTIM is transmitted with the two or more periods of the beacon interval (YES in Step S12), the radio communication apparatus STA notifies reception of only beacons including DTIM to the base station AP when the radio communication apparatus STA belongs to the cell (S13).

Next, after Steps S15 and S17 shown in FIG. 5 have been performed, a beacon including DTIM is periodically transmitted from the base station AP to the radio communication apparatus STA (S21). The beacon including DTIM includes information on a period when the next beacon including DTIM is transmitted from the base station AP. Thereby, the radio communication apparatus STA can receive only a beacons including DTIM.

In case that the radio communication apparatus STA receives the beacon including DTIM (YES in Step S31), the radio communication apparatus STA transfers to the Lazy mode LZ (S32). In case that the radio communication apparatus STA does not receive this beacon (NO in Step S31), the radio communication apparatus STA operates in the Doze mode DZ until a beacon including DTIM is received (S34).

In case that the radio communication apparatus STA receives a beacon including DTIM (YES in Step S31), Steps S40 to S70 shown in FIG. 5 are performed after Step S32. For example, as shown in FIG. 6, it is assumed that, when the radio communication apparatus STA receives the beacon $B_1$, non-transmitted data has not been stored in the base station AP. In this case, the radio communication apparatus STA once transfers to the Lazy mode LZ, and returns back to the Doze mode DZ after the radio communication apparatus STA processed the beacon $B_1$.

When the radio communication apparatus STA receives the beacon $B_4$, unicast data $UD_1$ and broadcast data $BD_1$ are stored in the base station AP as non-transmitted data pieces in an interval between the beacons $B_1$ and $B_4$. Thereby, the radio communication apparatus STA transfers to the Lazy mode LZ, and after processing the beacon $B_4$, the radio communication apparatus STA transfers to the Awake mode AW for receiving the unicast data $UD_1$ and the broadcast data $BD_1$ from the base station AP as the non-transmitted data pieces. The radio communication apparatus STA receives the unicast data $UD_1$ and the broadcast data $BD_1$, the radio communication apparatus STA transfers back to the Doze mode DZ.

Further, when the radio communication apparatus STA receives the beacon $B_7$, unicast data $UD_2$ and multicast data $MD_1$ are stored in the base station AP as non-transmitted data pieces in an interval between the beacons $B_4$ and $B_7$. Thereby, after the radio communication apparatus STA transfers to the Lazy mode LZ to process the beacon $B_7$, the radio communication apparatus STA transfers to the Awake mode AW for receiving the unicast data $UD_2$ and the multicast data $MD_1$ from the base station AP as the non-transmitted data pieces. After the radio communication apparatus STA receives the unicast data $UD_2$ and the multicast data $MD_1$, the radio communication apparatus STA transfers back to the Doze mode DZ.

The radio communication apparatus STA knows a transmission timing of a beacon including DTIM. Thereby, in case that a beacon does not include DTIM, that is, that the beacon includes TIM, the radio communication apparatus STA continues to operate in the Doze mode DZ. For example, in case that the radio communication apparatus STA receives the beacons $B_2$, $B_3$, $B_5$, $B_6$ and $B_8$ from the base station AP, the radio communication apparatus STA maintains the Doze mode DZ.

The processing using the above-described Doze mode DZ/Lazy mode LZ/Awake mode AW is performed repeatedly as far as the radio communication apparatus STA is in the power save mode.

According to this embodiment, the radio communication apparatus STA receives beacons intermittently in this manner. Thereby, the radio communication apparatus STA according to this embodiment is further reduced in power consumption, as compared with the radio communication apparatus STA according to the first embodiment. However the radio communication apparatus STA according to this embodiment is inferior in throughput to the radio communication apparatus STA according to the first embodiment.

According to this embodiment, the radio communication apparatus STA receives a beacon including DTIM. Thereby, the radio communication apparatus STA can recognize whether not only unicast data but also multicast data and broadcast data have been stored in the base station AP or not.

In this embodiment, the radio communication apparatus STA receives beacons including DTIM every time. However, the radio communication apparatus STA may receive beacons including DTIM intermittently. For example, the radio communication apparatus STA can transfer to the Lazy mode LZ only when it receives the beacons $B_1$ and $B_7$ among the beacons $B_1$, $B_4$ and $B_7$ shown in FIG. 6. Thereby, the beacon reception interval becomes six periods. As a result, the radio communication apparatus STA can further be reduced in power consumption.

(Third Embodiment)

Figure 8:
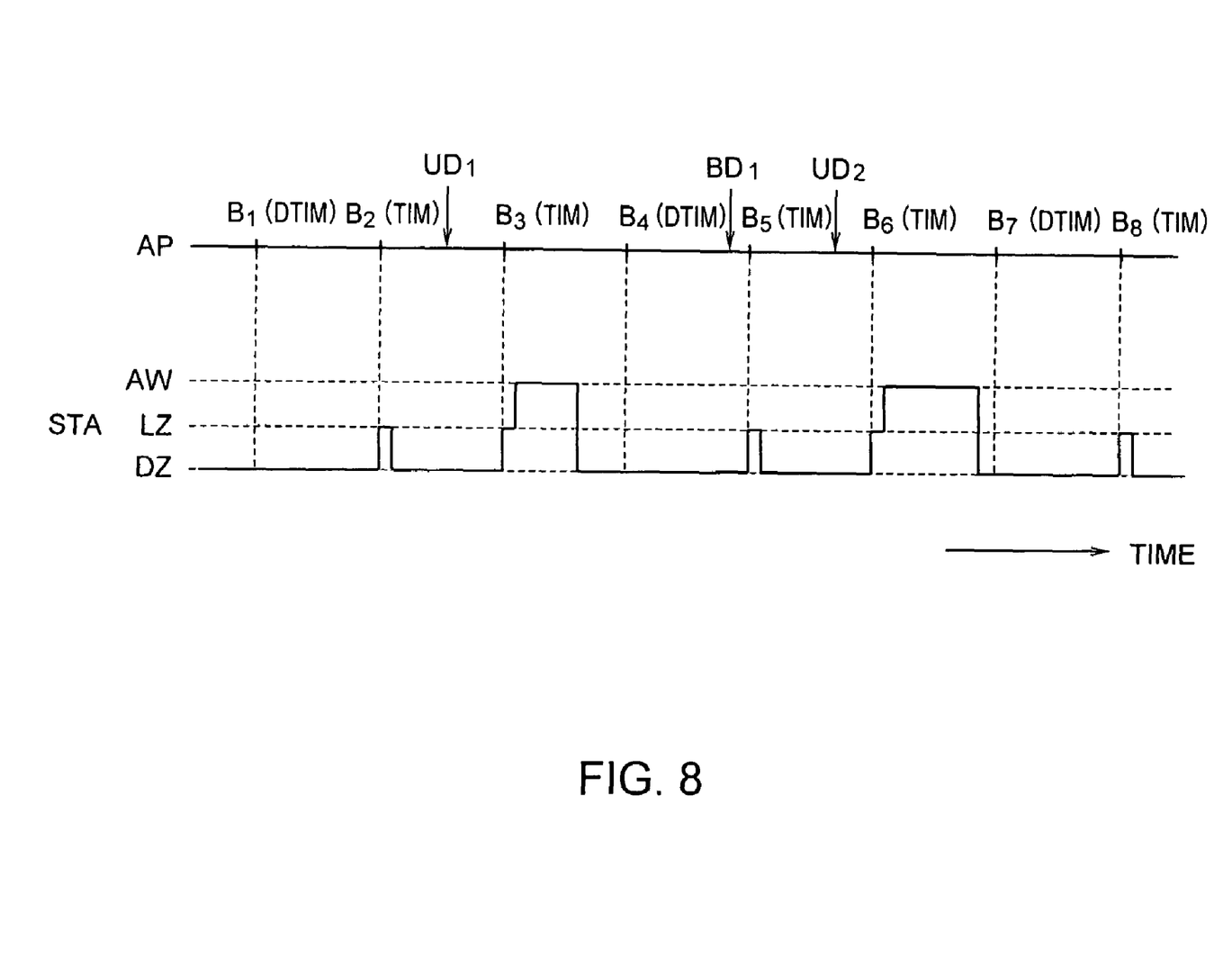
FIG. 8 is a diagram showing transmission period of beacons of base station AP and a mode of the radio communication apparatus STA in a time elapsing manner according to a third embodiment.
Figure 9:
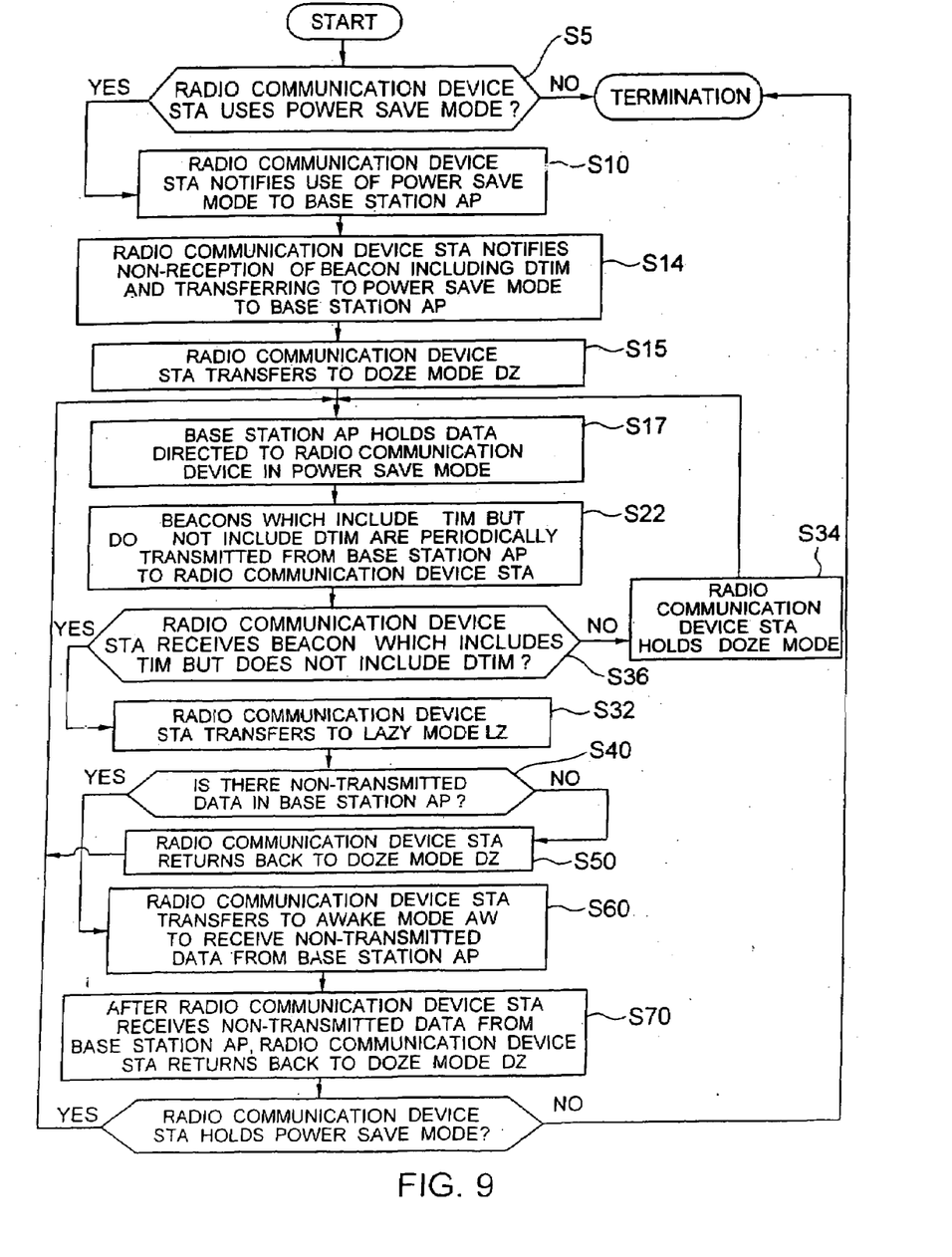
FIG. 9 is a flow diagram showing a flow of the operation of the radio communication apparatus STA according to the third embodiment.

FIG. 8 is a diagram showing transmission period of beacons of base station AP and a mode of the radio communication apparatus STA in a time elapsing manner according to a third embodiment. FIG. 9 is a flow diagram showing a flow of the operation of the radio communication apparatus STA according to the third embodiment. This embodiment can be implemented using the radio communication apparatus STA shown in FIG. 2. In this embodiment, the radio communication apparatus STA discriminates a beacon including DTIM with a beacon including TIM to receive only beacons including TIM.

In this embodiment, the radio communication apparatus STA receives a beacon including TIM but does not receive a beacon including DTIM in the power save mode. This embodiment is different in this point from the second embodiment.

The base station AP transmits a beacon including TIM and a beacon including DTIM at the period shown in FIG. 8. In this embodiment, the DTIM interval may also be two periods, or it may be four or more periods.

In this embodiment, Steps S5 and S10 shown in FIG. 5 are performed first. When the radio communication apparatus STA operates in the power save mode, the radio communication apparatus STA notifies non-reception of a beacon including DTIM to the base station AP and notifies transference of the power save mode to the base station AP (S14). Next, Steps S15 and S17 shown in FIG. 5 are executed. The radio communication apparatus STA knows a transmission timing of a beacon including DTIM from information included in the beacon which is acquired before transference to the power save mode. Thereby, the radio communication apparatus STA can receive only beacons including TIM of beacons.

Next, the base station AP transmits beacons which include TIM but do not include DTIM to the radio communication apparatus STA periodically (S22). In case that the radio communication apparatus STA receives a beacon which includes TIM but does not include DTIM (YES in Step S36), the radio communication apparatus STA transfers to the Lazy mode LZ (S32). When the radio communication apparatus STA does not receive such a beacon (NO in Step S36), the radio communication apparatus STA operates in the Doze mode DZ until it receives a beacon includes TIM (S34).

In case that the radio communication apparatus STA receives a beacon including TIM (YES in Step S36), Steps S40 to S70 shown in FIG. 5 are conducted after Step S32. For example, it is assumed that, when the radio communication apparatus STA receives the beacon $B_2$, non-transmitted data has not been stored in the base station AP. In this case, the radio communication apparatus STA once transfers to the Lazy mode LZ and, after processing the beacon $B_2$, the radio communication apparatus STA returns back to the Doze mode DZ.

When the radio communication apparatus STA receives the beacon $B_3$, unicast data $UD_1$ is stored in the base station AP as non-transmitted data in an interval between the beacons $B_2$ and $B_3$. Thereby, after the radio communication apparatus STA transfers to the Lazy mode LZ to process the beacon $B_3$, the radio communication apparatus STA transfers to the Awake mode AW for receiving the unicast data $UD_1$ from the base station AP as the non-transmitted data. After the radio communication apparatus STA receives the unicast data $UD_1$, it transfers to the Doze mode DZ.

When the radio communication apparatus STA receives the beacon $B_5$, broadcast data $BD_1$ is stored in the base station AP as non-transmitted data in an interval between the beacons $B_4$ and $B_5$. As described above, however, TIM does not have information about whether or not broadcast data and multicast data have been stored in the base station AP. Accordingly, after the radio communication apparatus STA transfers to the Lazy mode LZ to process the beacon $B_5$, the radio communication apparatus STA transfers to the Doze mode DZ. In this case, the broadcast data $BD_1$ remains to be stored in the base station AP.

Further, when the radio communication apparatus STA receives the beacon $B_6$, unicast data $UD_2$ is stored in the base station AP as non-transmitted data in an interval between the beacons $B_5$ and $B_6$. Thereby, after the radio communication apparatus STA transfers to the Lazy mode LZ to process the beacon $B_6$, the radio communication apparatus STA transfers to the Awake mode AW for receiving the unicast data $UD_2$ from the base station AP as the non-transmitted data. At this time, broadcast data $BD_1$ has been stored in the base station AP, but the broadcast data $BD_1$ is not received, because it is not transmitted after TIM. After the radio communication apparatus STA receives the unicast data $UD_2$, it transfers to the Doze mode DZ.

In case that a beacon including DTIM is transmitted from the base station AP, the radio communication apparatus STA holds the Doze mode DZ. For example, the radio communication apparatus STA is maintained in the Doze mode DZ at timings when the base station AP transmits beacons $B_1$, $B_4$ and $B_7$. After the base station AP transmits a beacon $B_n$ including DTIM, the base station AP transmits the broadcast data $BD_1$ but the broadcast data $BD_1$ is not received by the radio communication apparatus STA. The above operation is performed repeatedly as far as the radio communication apparatus STA is in the power save mode.

Thus, according to the third embodiment, the radio communication apparatus STA receives only beacons including TIM but does not receive any beacon including DTIM. Therefore, the radio communication apparatus STA according to the embodiment is reduced in power consumption, as compared with the radio communication apparatus STA according to the first embodiment. Further, the radio communication apparatus STA may receive all beacons including TIM or may receive some of them intermittently. For example, the radio communication apparatus STA can receive only beacons $B_2$, $B_5$ and $B_8$ shown in FIG. 8.

According to this embodiment, the radio communication apparatus STA receives beacons including TIM. Therefore, the radio communication apparatus STA has only to transfer to the Awake mode AW only when unicast data addressed to its own station STA has been stored in the base station AP. In generally, the broadcast data and the multicast data are low in significance for the user of the radio communication apparatus STA. On the other hand, unicast data adressed to its own station STA is relatively high in significance for the user of the radio communication apparatus STA. According to this embodiment, when broadcast data and multicast data which are low in significance are transmitting from the base station AP, the radio communication apparatus STA transfers to the Doze mode DZ without receiving these data. Therefore, the power consumption of the radio communication apparatus STA can be reduced. On the other hand, when unicast data which is high in significance has been stored in the base station AP, the radio communication apparatus STA transfers to the Awake mode AW. Accordingly, the radio communication apparatus STA can receive unicast data at the right time.

Note that the invention is not limited to the above described embodiments themselves, component elements can be modified and embodied within a range not desorbing the content thereof in the practical phase. Further, various inventions can be formed by suitable combination of plural component elements disclosed in the above described embodiments. For example, some component elements may be deleted from all of the component elements shown in the embodiments. Furthermore, component elements adopted to different embodiments may be suitably combined.

Other embodiments of the present invention will be apparent to those skilled in the art from consideration of the specification and practice of the invention disclosed herein. It is intended that the specification and example embodiments will be considered as exemplary only, with a true scope and spirit of the invention being indicated by the following.

What is claimed is:

1. A radio communication apparatus which communicates with a base station in radio communication, comprising:

an antenna;

a reception processing unit which receives a signal transmitted from the base station via the antenna;

an indication signal processing unit which processes an indication signal including information on the base station, said indication signal being transmitted from the base station periodically;

an authentication processing unit which performs authentication processing with the base station to establish communication connection between the base station and the radio communication apparatus and to receive data from the base station; and a transmission processing unit which transmits a signal to be transmitted to the base station via the antenna, wherein, when the reception processing unit receives the indication signal without data, the authentication processing unit and the transmission processing unit are in OFF state, and the reception processing unit and the indication signal processing unit are in ON state.

2. A radio communication apparatus according to claim 1, further comprising:

an association processing unit which recognizes a cell to which the radio communication apparatus belongs, the cell being one of cells which indicate, respectively, ranges of reach of radio waves from a plurality of the base stations, said association processing unit causing the base station to recognize that the radio communication apparatus belongs to the cell managed by said base station, and, further, causing the other base stations in other cells to recognize the cell to which the radio communication apparatus belongs, wherein when the reception processing unit receives the indication signal, the association processing unit is in OFF state.

3. A radio communication apparatus according to claim 1, wherein the indication signal includes information indicating presence or absence of non-transmitted data to be transmitted from the base station to the radio communication apparatus, when the reception processing unit receives the indication signal, the authentication processing unit is in OFF state and the reception processing unit and the indication signal processing unit are in ON state, and as a result of processing the indication signal at the indication signal processing unit, in case that the base station has the non-transmitted data, the reception processing unit and the indication signal processing unit are maintained in ON state, and the authentication processing unit is changed to ON state; on the contrary, in case that the base station does not have non-transmitted data, the authentication processing unit is maintained in OFF state, and the reception processing unit and the indication signal processing unit are changed to OFF state.

4. A radio communication apparatus according to claim 1, wherein the indication signal includes information on a time when another indication signal following the indication signal will be transmitted, while the indication signal is not transmitted, the authentication processing unit, the reception processing unit and the indication signal processing unit are in OFF state, and, for each transmission of the indication signal, the authentication processing unit is changed to OFF state and the reception processing unit and the indication signal processing unit are changed to ON state.

5. A radio communication apparatus according to claim 1, wherein in case that the indication signal includes first information indicating presence or absence of multicast data or broadcast data to be transmitted from the base station to the radio communication apparatus, the authentication processing unit is in OFF state, and the reception processing unit and the indication signal processing unit are in ON state, and in case that the indication signal includes second information indicating presence or absence of unicast data addressed to the radio communication apparatus to be transmitted from the base station to the radio communication apparatus and in case that the indication signal does not include the first information, the authentication processing unit, the reception processing unit and the indication signal processing unit are in OFF state.

6. A radio communication apparatus according to claim 1, wherein in case that the indication signal includes first information indicating presence or absence of multicast data or broadcast data to be transmitted from the base station to the radio communication apparatus, the authentication processing unit, the reception processing unit and the indication signal processing unit are in OFF state, and in case that the indication signal includes second information indicating presence or absence of unicast data addressed to the radio communication apparatus to be transmitted from the base station to the radio communication apparatus and in case that the indication signal does not include the first information, the authentication processing unit is in OFF state and the reception processing unit and the indication signal processing unit are in ON state.

7. A wireless LAN system comprising the communication apparatus according to claim 1.

8. A radio communication method which uses a radio communication apparatus including a reception processing unit which receives a signal transmitted from a base station in radio communication, and a processor processing an indication signal which includes information about the base station and which is transmitted from the base station periodically, said processor conducting an authentication processing with the base station to establish communication connection between the base station and the radio communication apparatus and to receive data from the base station, comprising maintaining the reception processing unit and the processor in OFF state while the reception processing unit is not receiving the indication signal, and processing the indication signal at the processor without processing the authentication when the reception processing unit receives the indication signal without data.

9. A radio communication method according to claim 8, wherein the indication signal includes information on presence or absence of non-transmitted data to be transmitted from the base station to the radio communication apparatus;

further comprising after processing the indication signal, conducting the authentication processing in the processor in case that the base station has the non-transmitted data, and getting the processor to OFF state in case that the base station does not have the non-transmitted data.

10. A radio communication apparatus comprising:

a processor processing an indication signal which includes information indicating presence or absence of non-transmitted data to be transmitted from a base station to the radio communication apparatus, said processor processing an authentication processing with the base station to receive the non-transmitted data from the base station, said indication signal being transmitted from the base station periodically; wherein the radio communication apparatus operates in one of states including a first mode in which the processor processes the indication signal to receive the indication signal, a second mode in which the processor conducts the authentication processing to receive the non-transmitted data and a third mode in which the processor does not process the indication signal or conduct the authentication processing.

11. A radio communication apparatus according to claim 10, wherein
the non-transmitted data is a unicast data addressed to the radio communication apparatus,
wherein the radio communication apparatus enters the second mode in case that the indication signal indicates that the base station has the unicast data,
wherein the radio communication apparatus enters the third mode in case that the indication signal indicates that the base station does not have unicast data.

12. A radio communication apparatus according to claim 10, wherein
the radio communication apparatus is changed from the second mode to the third mode after informing the base station that the radio communication apparatus will be in a power-save mode,
wherein the radio communication apparatus is in the first mode when said radio communication apparatus receives the indication signal from the base station,
wherein the radio communication apparatus enters the second mode in case that the indication signal indicates that the base station has the non-transmitted data,
wherein the radio communication apparatus enters the third mode in case that the indication signal indicates that the base station does not have the non-transmitted data.

13. A radio communication apparatus according to claim 10 further comprising:
a transmission processing unit being in ON state in the second mode to execute a data transmission process, said transmission processing unit being in OFF state in the third mode;
wherein the radio communication apparatus is changed from the second mode to the third mode after informing the base station that the radio communication apparatus is in a power-save mode;
wherein the radio communication apparatus lies in the first mode when the radio communication apparatus receives the indication signal from the base station,
wherein the radio communication apparatus enters the second mode in case that the indication signal indicates that the base station has the non-transmitted data,
wherein the radio communication apparatus enters the third mode in case that the indication signal indicates that the base station does not have the non-transmitted data,
wherein the radio communication apparatus enters the second mode in case that the transmission processing unit transmits data.

14. A wireless LAN system comprising the communication apparatus according to claim 10.

15. A radio communication apparatus which communicates with a base station in radio communication, comprising:
an antenna;
a reception processing unit which receives a signal transmitted from the base station via the antenna;
a transmission processing unit transmitting data to the base station via the antenna;
an indication signal processing unit which processes an indication signal including information on the base station, said indication signal being transmitted from the base station periodically;
an authentication processing unit which performs authentication processing with the base station to establish communication connection between the base station and the radio communication apparatus and to receive data from the base station; and an association processing unit which performs association processing with the base station;
wherein, when the reception processing unit receives the indication signal without data, the transmission processing unit, the authentication processing unit and the association processing unit are maintained in OFF state, and the reception processing unit and the indication signal processing unit are in ON state to process the indication signal.

* * * * *